United States Patent [19]

Jabsen

[11] 4,072,564
[45] Feb. 7, 1978

[54] MOTION RESTRAINING APPARATUS FOR A NUCLEAR REACTOR

[75] Inventor: Felix S. Jabsen, Lynchburg, Va.

[73] Assignee: The Babcock & Wilcox Company, New York, N.Y.

[21] Appl. No.: 726,397

[22] Filed: Sept. 24, 1976

[51] Int. Cl.² .............................................. G21C 3/30
[52] U.S. Cl. .......................................... 176/76; 176/87
[58] Field of Search .................... 176/50, 77, 76, 87

[56] References Cited

U.S. PATENT DOCUMENTS

| | | | |
|---|---|---|---|
| 3,398,050 | 8/1968 | Yevick et al. | 176/50 X |
| 3,736,226 | 5/1973 | Sakurama | 176/50 |
| 3,770,583 | 11/1973 | Klumb et al. | 176/87 X |
| 3,853,703 | 12/1974 | Anthony et al. | 176/87 |
| 4,003,787 | 1/1977 | Marmonier et al. | 176/78 X |

*Primary Examiner*—Peter A. Nelson
*Attorney, Agent, or Firm*—J. M. Maguire; J. P. Sinnott

[57] ABSTRACT

A typical embodiment of the invention provides a means for restraining the fuel elements within a nuclear reactor core from movement during reactor operation. Illustratively, within one of the fuel element end fittings a rectangular grid of torsion bars is positioned with the ends of each of the bars anchored in opposing parallel sides of the end fitting. Individual torsion arms fastened to the midportion of each of the respective torsion bars protrude above the end fitting to bear against the adjacent grid pads and thereby restrain motion in the direction of coolant flow. In the opposite fuel element end fitting a tube that extends through the length of the fuel element is connected to the center of a convex spring. The two ends of the spring are hinged to respective locking bars that are cammed to move in a direction that is transverse to the axis of the tube. As the fuel element moves in the direction of coolant flow, the tube presses the convex spring flat. The flattening spring, in turn, drives the locking bars into engagement with mating latches on the adjacent support grid to prevent further movement of the fuel element.

5 Claims, 4 Drawing Figures

MOTION RESTRAINING APPARATUS FOR A NUCLEAR REACTOR

BACKGROUND OF THE INVENTION

1. FIELD OF THE INVENTION

This invention relates to fuel elements for nuclear reactor cores and, more particularly, to apparatus for restraining longitudinal fuel element movement within a reactor core, and the like.

2. PRIOR ART

In a nuclear reactor, heat is generated for ultimate conversion into useful electrical power, and the like, through sustained fission processes that take place within the reactor core. To continue this sequence of nuclear fission events it is necessary to assemble a critical concentration of uranium, or other fissionable material, within the reactor core. Usually, an oxide of the fissionable material is shaped into small essentially right circular pellets that are located into long, slender hollow tubes, or fuel rods. Groups of two hundred or more of these fuel rods are arranged into more or less rigid fuel elements. These fuel elements, in turn, are organized into a large, generally cylindrical array that forms the reactor core.

Ordinarily, the collection of fuel elements that comprise the reactor core abut, on one end, a grill-like support grid that is disposed in a plane which is perpendicular to the longitudinal axes of the individual fuel rods.

To convert the fission process heat into useful work or into some form of usable energy, a suitable coolant is permitted to flow through the reactor core. Pressurized water is a typical coolant that frequently is used for this purpose. Most commonly, this pressurized water flows through the openings in the support grid and through the fuel elements in a direction that is generally parallel with the longitudinal axes of the fuel rods. It is, of course, from these fuel rods that the flowing pressurized water absorbs the heat the fission processes generate. After flowing through the fuel elements, the heated water is passed through a heat exchanger to transfer this heat to a secondary coolant, which is allowed to rise into the steam that drives the turbines in the power plant.

There is a natural tendency for the pressurized water to lift the fuel elements from the support grid. To cope with this particular hydrodynamic force, it has been customary to position another grid-like support plate at the discharge side of the reactor core, also in a plane which is generally parallel with the support plate at the inlet side. This discharge side support plate also is disposed in a plane that is perpendicular to the longitudinal axes of the fuel rods. To absorb and restrain longitudinal movement of the fuel elements, the ends of the fuel elements that are adjacent to the support plate at the discharge side of the reactor core usually are provided with coil springs which bear against the grid pads that protrude from the support plate toward the fuel elements.

Naturally, all of these fittings are not only very expensive but also tend to obstruct the flow of pressurized water through the reactor core, causing a reduction in the coolant flow volume, thereby producing further inefficiencies in the form of pressure losses.

After some period of use, a significant portion of the fissionable material within the core is consumed and the core, or a portion of the core, must be replaced. Frequently, the supplier for this replacement core is different from the original core supplier. There is, in this circumstance, a need to match not only the nuclear but also the hydraulic and mechanical characteristics of the replacement core to those of the original core. In this respect it is often necessary to conform the pressure loss of the replacement core to that of the original core without increasing or aggravating the hydrodynamic forces that tend to lift the fuel elements from the support plate on the inlet side of the core. There also is a further need, in many situations, to provide some means for resiliently absorbing or restraining the longitudinal motion of the fuel elements induced by the flowing coolant in a very small clearance between the ends of the fuel rods and the pads that protrude from the support grid at the reactor outlet.

Clearly, there is a need for an improved fuel element that will better restrain hydrodynamically induced fuel element movement at a lower cost than that which heretofore has been available, which will provide greater design flexibility for replacement (or "reload") core application, and the like.

SUMMARY OF THE INVENTION

The practice of the invention will, to a great extent, provide this desired improved porformance and increased design flexibility at a lower cost. More particularly, a rectangular array of torsion bars are mounted within one of the two end fittings on a given fuel element. The ends of each of these bars are rigidly fixed to opposite, interior parallel sides of the end fitting under consideration. Approximately in the middle of each bar, a torsion arm, also rigidly secured to the respective bar, protrudes above the end fitting. These torsion arms bear against grid pads that are fixed to the reactor core discharge grid plate. In these circumstances, as the hydrodynamic forces tend to move the fuel element against the discharge grid plate, the reaction torsion forces that are generated in the torsion bars through the action of the torsion arms that press against the respective grid pads restrains and generally suppresses this longitudinal motion.

As an additional feature of the invention, a positioner plates that is generally transverse to the longitudinal axes of the fuel rods is bolted to the end of a longitudinal tube that extends through the entire length of the fuel rod cluster. The opposite ends of the positioner plate protrude beyond the confines of the end fitting that accommodates the array of torsion bars, these protruding ends each engaging a respective grid pad.

At the opposite end of the fuel element, the tube protrudes from the fuel rod bundle and is secured to the midportion of a convex spring. The ends of the convex spring, moreover, are pinned each to one of a pair of lock bars that are cammed to move in diametrically opposite directions in a plane that is perpendicular to the longitudinal axes of the fuel rods.

Secured to the inlet support grid structure are pairs of protruding members, each with a cavity and alignment with a respective one of the lock bars. Ordinarily, in those circumstances in which the arcuate spring enjoys a convex curvature, the lock bars are housed within the confines of the associated end fitting. Responding to motion of the fuel element in a longitudinal direction, however, the positioner plate bears against the contacting grid pads, compelling the tube to move, relative to the fuel element, in the opposite longitudinal direction. This action tends to press the arcuate spring flat, thereby driving the lock bars out of the fuel element end fitting and causing these lock bars to latch with the associated cavities in the protruding inlet fuel element support grid members. Latching the fuel element to the inlet support grid in this manner arrests further movement in a longitudinal direction.

Clearly, the latching device and the torsion apparatus described herein can be used together on the same fuel element, separately on individual fuel elements in the same reactor core, in portions of a reactor core or in different cores as circumstances dictate. In any event, the invention provides a relatively inexpensive technique for positively arresting and restraining hydrodynamically induced fuel element motion.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DETAILED DESCRIPTION OF THE PREFERRED EMBODIMENTS

Figure 1:
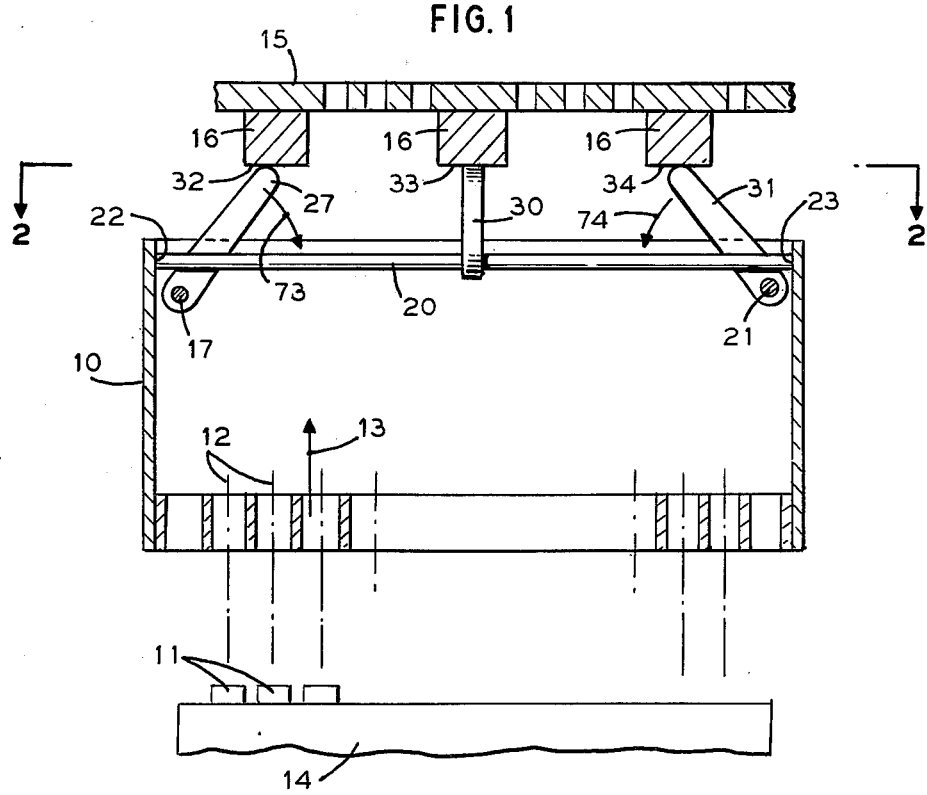
FIG. 1 is a front elevation in partial section of a portion of a fuel element that illustrates principles of the invention.

For a more complete appreciation, attention is invited to FIG. 1 which shows a typical hollow rectangular fuel element end fitting 10 that is associated with the reactor coolant discharge side of the fuel element. The end fitting 10 provides a suitable termination for an array of long, slender and generally cylindrical fuel rods 11 which have longitudinal axes 12. In this illustrative embodiment of the invention, the flow direction of the reactor core coolant—typically high temperature pressurized water—is parallel to the longitudinal axes 12 of the fuel rods 11 and in the direction of arrow 13. The longitudinal arrangement and relative spacings of the fuel rods 11, moreover, is maintained by means of cellular fuel element grids 14 which engage the fuel rod surfaces.

As shown the hydrodynamic forces imparted to the fuel element through the flowing coolant tends to "lift" or move the fuel element in the direction of the arrow 13, or toward a perforated fuel element grid support plate 15 that is disposed in a plane that is generally perpendicular to the longitudinal axes 12 of the fuel rods 11. The support plate 15 is spaced longitudinally from the end fitting 10 in a manner that permits the heated pressurized coolant which discharges from the fuel element to pass through the perforations in the plate 15. Grid plate blocks 16 are fastened to the side of the support plate 15 that is adjacent to the end fitting 10 in order to restrain motion of the fuel element in the direction of the arrow 13 in the manner described subsequently in more complete detail.

Turning once more to the end fitting 10, a generally rectangular array of torsion bars 17, 20 and 21 is positioned within the end fitting near the end of the fitting that is adjacent to the support plate 15. The longitudinal axes of the torsion bars 17, 20 and 21, moreover, are generally perpendicular to the fuel rod axes 12 and spaced inwardly from the sides of the end fitting 10. Torsion bar ends 22, 23 are fixed to the walls of the end fitting 10 in a manner that prevents the bars 17, 20 and 21 from rotating about their respective longitudinal axes, and effectively, restricts torsion bar motion to a torsional or twisting motion relative to these individual axes. For purposes of illustration, the transverse cross sections of the torsion bars 17, 20 and 21 shown in the drawing is round. This, however, is not particularly significant relative to the principles of the invention, and any suitable cross section, be it rectangular, hexagonal, and the like may be employed. The rectangular arrangement of the torsion bars 17, 20 and 21 is, perhaps, best seen in FIG. 2, in which which the opposite ends 22, 23 of the torsion bar 20 are fixed to opposite parallel walls of the end fitting 10. In a similar manner, although one of the walls of the end fitting 10 is not shown in FIG. 2, ends of the torsion bars 17, 21 also are fixed to opposing parallel end fitting walls. Further in this respect, a fourth torsion bar (not shown in FIG. 2 or visible in the FIG. 1 projection of the drawing) has a longitudinal axis that is parallel to the axis of the torsion bar 20 in order to complete the generally rectangular array of torsion bars that is described above. Note, in FIG. 2, that ends 24 and 25 of the torsion bars 17 and 21 also are fixed through butt welding or the like to a sidewall of the end fitting 10. Torsion arms 27, 30 and 31 further extend inwardly at an angle of about 60° relative to the longitudinal axes 12 of the fuel rods 11 in order to engage adjacent respective flat surfaces 32, 33 and 34 of the grid plate blocks 16. Naturally, there is a fourth torsion arm, that is not shown in FIG. 2 and that is not visible in the FIG. 1 projection which also bears on the flat surface of a companion grid plate block.

Figure 3:
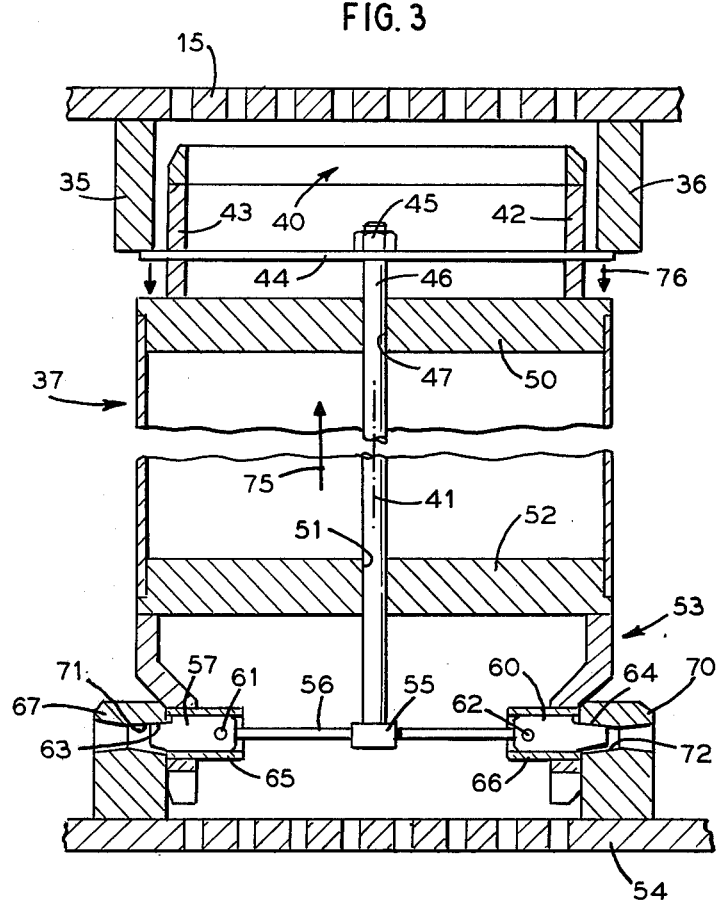
FIG. 3 is a front elevation of another fuel element that illustrates a further embodiment of the invention.

An additional feature of the invention is shown in FIG. 3. Typically, the coolant discharge fuel element grid support plate 15 has a pair of spaced blocks 35, 36 that protrude from the plate 15 toward the fuel element 37. As shown, the fuel element 37 has a coolant discharge end fitting 40 that is generally transverse to longitudinal axis 41 of the fuel element 37. A pair of slots 42, 43 are formed in a longitudinal direction, each in a respective opposite wall of the end fitting 40. Within the slots 42, 43 and guided by these slots is a flat, rectangular positioner plate 44 that is perpendicular to and coincident with the longitudinal axis 41. The positioner plate 44 is secured by means of a bolt 45, or other suitable means to a tube 46 which is concentric with the longitudinal axis 41. In the illustrative embodiment that characterizes FIG. 3, the tube 46 extends through the entire fuel rod bundle in the fuel element 37, the tube 46 being slidably received in aperture 47 that is formed in a transverse base plate 50 of the end fitting 40.

The tube 46 further protrudes from the fuel rod bundle through an aperture 51 that is formed in a transverse base plate 52 in a reactor coolant inlet fuel element end fitting 53 that is adjacent to a coolant inlet support grid 54. The protruding end of the tube 46 terminates in a bushing 55, that receives the middle portion of a spring 56. As illustrated in FIg. 3, the spring 56 extends across the end fitting 53 in a direction that is perpendicular to the longitudinal axis 41. The ends of the spring 56 moreover are secured, respectively, to generally cylindrical lock bars 57, 60 by means of pins 61, 62. In this way the ends of the spring 56 have some freedom for rotational motion relative to the lock bars 57, 60 in the plane of the drawing.

The lock bars 57, 60 each have respective flat shoulders or flanges 63, 64 formed on each of the bar ends that are opposite to the ends that accommodate the individual pins 61, 62. The lock bars 57, 60 moreover, are slidably received in respective cylindrical bushings 65, 66 which cam the lock bars for movement in a direction that is generally perpendicular to the orientation of the longitudinal axis 41.

A pair of spaced members 67, 70 protrude from the surface of the coolant inlet support grid 54 that is adjacent to the end fitting 53. The members 67, 70 essentially straddle a portion of the end fitting 53 in order to enable cavities 71, 72 that are formed in the members 67, 70, respectively to align with the cammed lock bars 57, 60 in the longitudinal direction.

Figure 2:
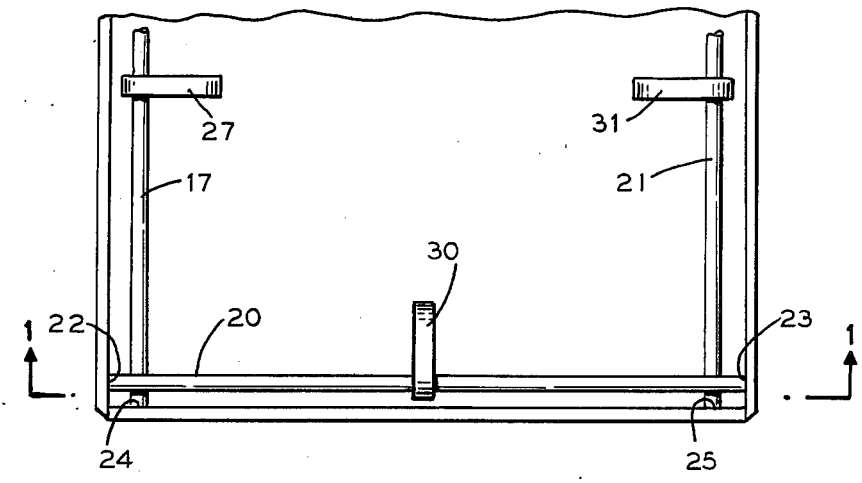
FIG. 2 is a plan view in broken section of the illustrative embodiment that is shown in FIG. 1, taken along the line 2—2 of FIG. 1 and viewed in the direction of the arrows.

In operation, as best illustrated in FIG. 2, reactor coolant flowing through the fuel element tends to move the entire fuel element in the longitudinal direction as indicated by the arrow 13. In this circumstance, the longitudinal motion of the fuel element presses the torsion arms 27, 30 and 31 against the respective flat surfaces 32, 33 and 34 of the grid plate blocks 16. This action tends to twist the torsion arms 27, 30 and 31 in the directions of arrows 72, 74, thereby twisting or establishing torsion forces in the torsion bars 17, 20 and 21 that resist the further motion of the fuel element in the direction of the arrow 13. In this way, a structure is provided that offers a high spring rate in a very small clearance to restrain hydrodynamically induced fuel element motion.

An additional feature of the invention is shown in FIG. 3. Coolant flow through the fuel element 37 in a direction that is parallel to the longitudinal axis 41 is indicated by means of arrow 75. As hereinbefore mentioned, the hydraulic effect of this flow is to "lift" the fuel element 37, or move the fuel element in the direction of the arrow 75. As the fuel element 37 shifts in the direction of the arrow 75, the blocks 35, 36 bear against the ends of the positioner plate 44 and press this plate in the direction of arrow 76. Effectively, in the embodiment of the invention that is under consideration, the positioner plate 44 and the longitudinal tube 46 to which the plate is attached move in a direction that is exactly opposite to the direction of movement for the balance of the fuel element structure that is indicated by the arrow 75.

Figure 4:
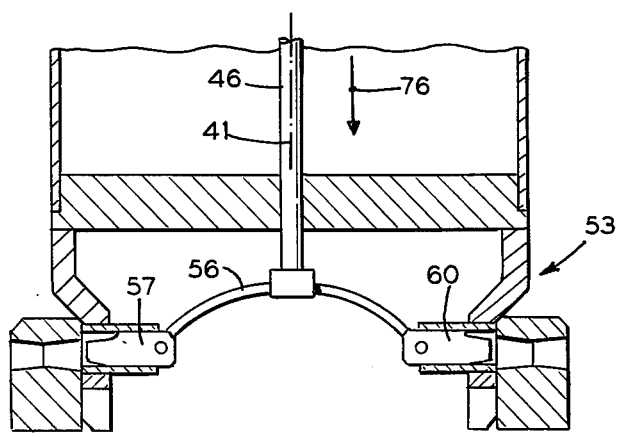
FIG. 4 illustrates a portion of the fuel element that is shown in FIG. 3 in which some of the mechanisms that characterize the invention are in a different position.

Turning now to FIG. 4, it can be seen that the usual unstressed condition of the spring 56 is a convex arc. As the tube 46 presses in the direction of the arrow 76, however, the lock bars 57, 60 which in the unstressed status are fully retracted within the perimeter of the end fitting 53 are then forced outwardly from the fitting in a direction that is perpendicular to the longitudinal axis 41. Best illustrated in FIG. 3, the hitherto arcuately convex spring 56 in this circumstance is flattened and latches the lock bars 57, 60 with the respective cavities 71, 72 in the spaced members 67, 70. Preferably, the shoulders or flanges 63, 64 engage and bear against the corresponding cavity surfaces, thereby positively locking the fuel elememt 37 to the coolant inlet support grid and arresting further motion of the fuel element in the direction of the arrow 75.

In summary, there is provided a simple and relatively inexpensive technique for restraining fuel element motion that significantly increases the design flexibility for application to new reactor cores and core reloads.

The embodiments of the invention in which an exclusive property of privilege is claimed are defined as follows:

1. A motion restraining apparatus for a nuclear reactor that has a fuel element support plate spaced from the reactor core coolant discharge side of the fuel element and in which the fuel element has a plurality of fuel rods with longitudinal axes that are generally parallel to the direction of reactor core coolant flow comprising an end fitting for the coolant discharge side of the fuel element, and torsion bar means mounted within said end fitting to bear against the fuel element support plate and restrain motion of the fuel element in the direction of the core coolant flow.

2. An apparatus according to claim 1 wherein said torsion means further comprises a plurality of torsion bars, each of said torsion bars being fixed to said end fitting and a plurality of torsion arms, each of said torsion arms being fixed to the middle portion of a respective one of said torsion bars, said torsion arms bearing against the fuel element support plate and converting the motion of the fuel element in the direction of coolant flow toward said support plate into a reactive torsion force that restrains further movement of the fuel element in the coolant flow direction.

3. A motion restraining apparatus for a nuclear reactor that has a fuel element support plate spaced from the reactor core coolant discharge side of the fuel element and a support plate spaced from the reactor core coolant inlet side of the fuel element and in which the fuel element has a plurality of fuel rods with longitudinal axes that are generally parallel to the direction of reactor core coolant flow comprising means for engaging the discharge side support plate in response to motion of the fuel element toward the discharge side support plate, lock bar means mounted in the fuel element and spaced from the coolant inlet side support plate coupled to said engaging means for selectively protruding from the fuel element, at least one member protruding from the coolant inlet side support plate having at least one cavity formed therein in alignment with said lock bar means to enable said lock bar means to latch the fuel element to the coolant inlet side support plate and arrest further movement of the fuel element toward the coolant discharge side support plate and a spring connected to said lock bar means to drive said lock bar means into latching engagement with said aligned cavity in response to motion of the fuel element toward the coolant discharge side support plate.

4. An apparatus according to claim 3 wherein said engaging means and said lock bar means further comprise a tube joined to said engaging means and protruding from the fuel rods adjacent to said lock bar means.

5. A motion restraining apparatus for a nuclear reactor that has a fuel element support plate spaced from the reactor core coolant discharge side of the fuel element and a support plate spaced from the reactor core coolant inlet side of the fuel element and in which the fuel element has a plurality of fuel rods with longitudinal axes that are generally parallel to the direction of coolant flow comprising an end fitting for the coolant discharge side of the fuel element, torsion bar means mounted within said end fitting to bear against the coolant discharge side support plate, means for engaging the discharge side support plate in response to motion of the fuel element theretoward, lock bar means mounted in the fuel element and spaced from the coolant inlet side support plate coupled to said engaging means for selectively protruding from the fuel element, and at least one member protruding from the coolant inlet side support plate having at least one cavity formed therein in alignment with said lock bar means to enable said lock bar means to latch the fuel element to the coolant inlet side support plate, whereby said torsion means and said lock bar means cooperatively arrest further movement of the fuel element toward the coolant discharge side support plate.

* * * * *